(12) United States Patent
Yu

(10) Patent No.: US 11,350,615 B2
(45) Date of Patent: Jun. 7, 2022

(54) SEINE NET

(71) Applicant: Tien-Chih Yu, New Taipei (TW)

(72) Inventor: Tien-Chih Yu, New Taipei (TW)

( * ) Notice: Subject to any disclaimer, the term of this patent is extended or adjusted under 35 U.S.C. 154(b) by 77 days.

(21) Appl. No.: 16/934,859

(22) Filed: Jul. 21, 2020

(65) Prior Publication Data

US 2022/0022436 A1    Jan. 27, 2022

(51) Int. Cl.
*A01K 73/12*  (2006.01)
*A01K 75/00*  (2006.01)

(52) U.S. Cl.
CPC .............. *A01K 73/12* (2013.01); *A01K 75/00* (2013.01)

(58) Field of Classification Search
CPC ........ A01K 73/12; A01K 75/00; A01K 69/02; A01K 73/00; A01K 74/00; A01K 93/00; A01K 97/20; E02B 5/085; E02B 8/023; E02B 8/026
USPC ............................................. 210/162, 170.1
See application file for complete search history.

(56) References Cited

U.S. PATENT DOCUMENTS

| | | | | |
|---|---|---|---|---|
| 2,310,702 | A | * | 6/1940 | Ljubetich ............... A01K 73/12 |
| 2,608,782 | A | * | 7/1949 | Bottemanne .......... A01K 73/02 |
| 2006/0272196 | A1 | * | 12/2006 | Safwat ................... A01K 73/02 |
| | | | | 43/9.95 |

* cited by examiner

*Primary Examiner* — Joshua E Rodden
*Assistant Examiner* — Henry Hooper Mudd
(74) *Attorney, Agent, or Firm* — Chun-Ming Shih; HDLS IPR Services

(57) ABSTRACT

A seine net includes a net body having a woven net, an upper rope, a lower rope, a left wing net and a right wing net. The woven net has a division rope disposed between the upper rope and the lower rope, upper mesh areas woven between the upper rope and the division rope and horizontally juxtaposed, and lower mesh areas woven between the lower rope and the division rope and horizontally juxtaposed. Each upper mesh area has multiple first diamond meshes. Each lower mesh area has multiple second diamond meshes. The first diamond meshes are reversely arranged relative to the second diamond meshes. The first diamond meshes and the second diamond meshes gradually decrease in size from the left and right wing nets toward the net middle.

6 Claims, 4 Drawing Sheets

SEINE NET

BACKGROUND OF THE INVENTION

Technical Field

The invention relates to a fishing net, particularly to a seine net.

Related Art

Conventional fishing nets are composed of fine meshes woven by thread. The meshes are smaller in size than the fish that the fishing nets are attempting to catch, so that it is harder for the fish to escape from the meshes when a fishing ship is towing a fishing net. Afterwards, the fishing net is reeled back in to gather and find the fish.

However, such a fishing net has a drawback as follows. Because the fishing net is large in volume and heavy in weight, it cannot be properly folded and effectively stored if the meshes are not closed up when being reeled back. This has been a real problem for a long time.

In view of this, the inventors have devoted themselves to the above-mentioned prior art, and researched intensively and cooperated with the application of science to try to solve the above-mentioned problems, which has become the goal of the inventors' improvement.

SUMMARY OF THE INVENTION

An object of the invention is to provide a seine net, whose first diamond meshes and the second diamond meshes can automatically close up to reduce the volume of the retrieved fishing net and increase smoothness of retrieving the net.

To accomplish the above object, the seine net of the invention includes a net body having a woven net, an upper rope disposed at an upper side of the woven net, a lower rope disposed at a lower side of the woven net, a left wing net disposed at a left side of the woven net and a right wing net disposed at a right side of the woven net. The woven net has a middle mesh section, a division rope disposed between the upper rope and the lower rope, upper mesh areas woven between the upper rope and the division rope and horizontally juxtaposed, and lower mesh areas woven between the lower rope and the division rope and horizontally juxtaposed. Each upper mesh area has multiple first diamond meshes. Each lower mesh area has multiple second diamond meshes, and the first diamond meshes are reversely arranged relative to the second diamond meshes on a basis of the division rope. The first diamond meshes of the upper mesh areas gradually decrease in size from the left and right wing nets toward the middle mesh section. The second diamond meshes of the lower mesh areas gradually decrease in size from the left and right wing nets toward the middle mesh section.

Accordingly, the first diamond meshes and the second diamond meshes are reversely arranged relative to the second diamond meshes on a basis of the division rope, so the first diamond meshes and the second diamond meshes will close up toward the middle of the woven net to increase smoothness of retrieving the net.

Accordingly, each first separation rope gradually approaches the inclined line of the middle mesh section from the division rope to the upper rope, and each second separation rope gradually approaches the inclined line of the middle mesh section from the division rope to the lower rope, so as to guide the upper mesh areas and the lower mesh areas to be superposed toward the middle mesh section along the retrieving direction to increase smoothness of retrieving the net.

DETAILED DESCRIPTION OF THE INVENTION

The details and contents of the invention will be described in the basis of the drawings as follows. However, the drawings are used for understanding instead of limiting the invention.

Figure 1:
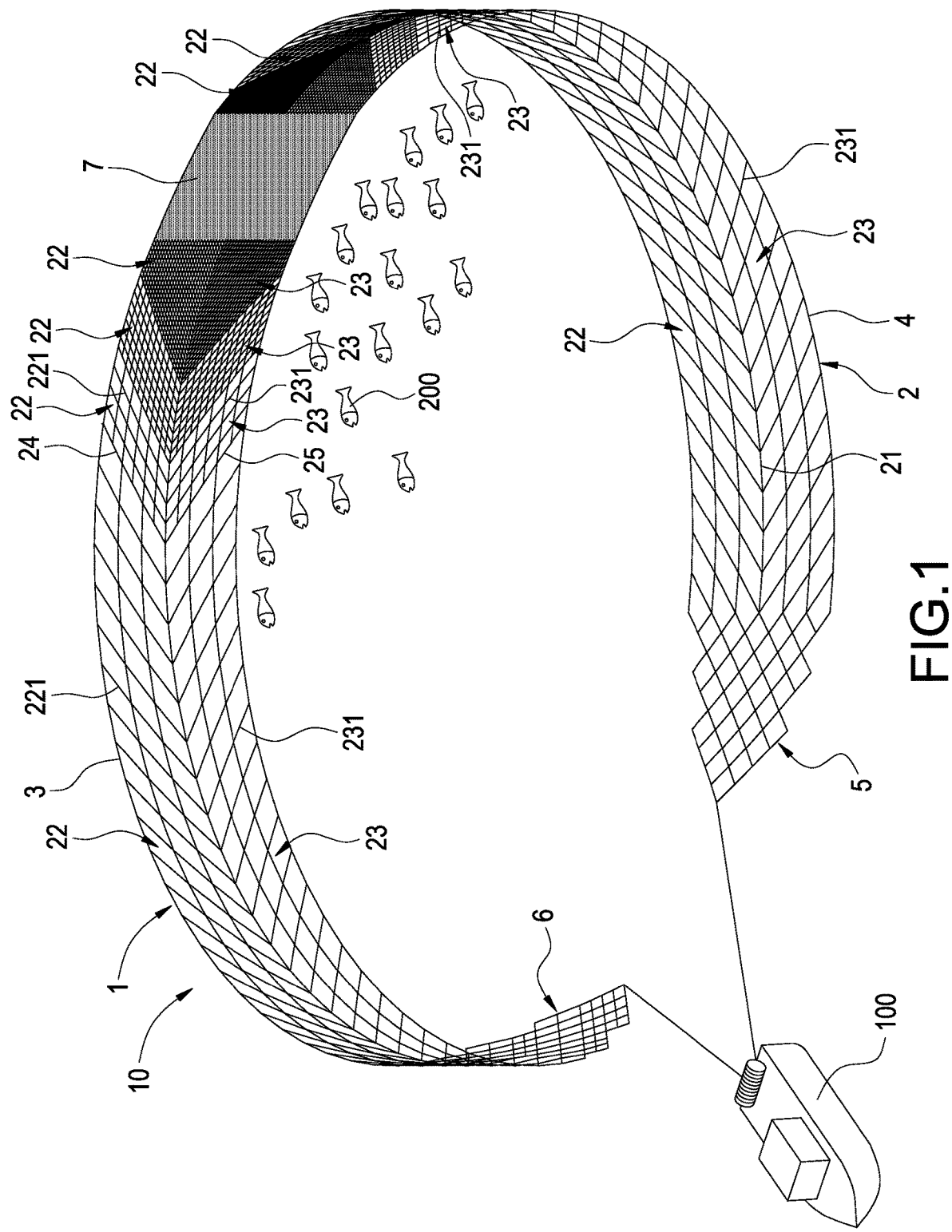
FIG. 1 is a schematic view of the seine net of the invention in use.
Figure 2:
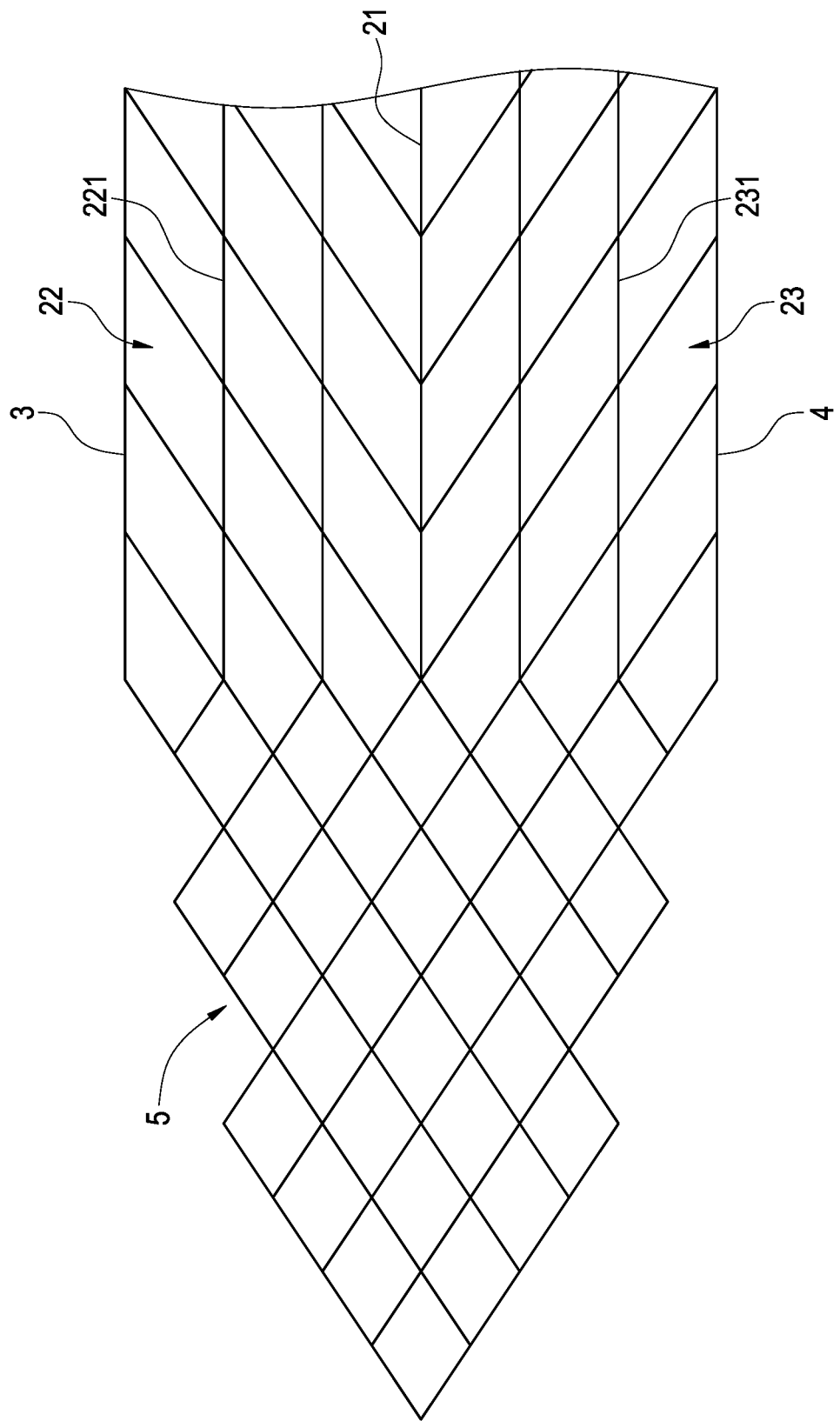
FIG. 2 is a partially enlarged schematic view of the seine net of the invention.
Figure 3:
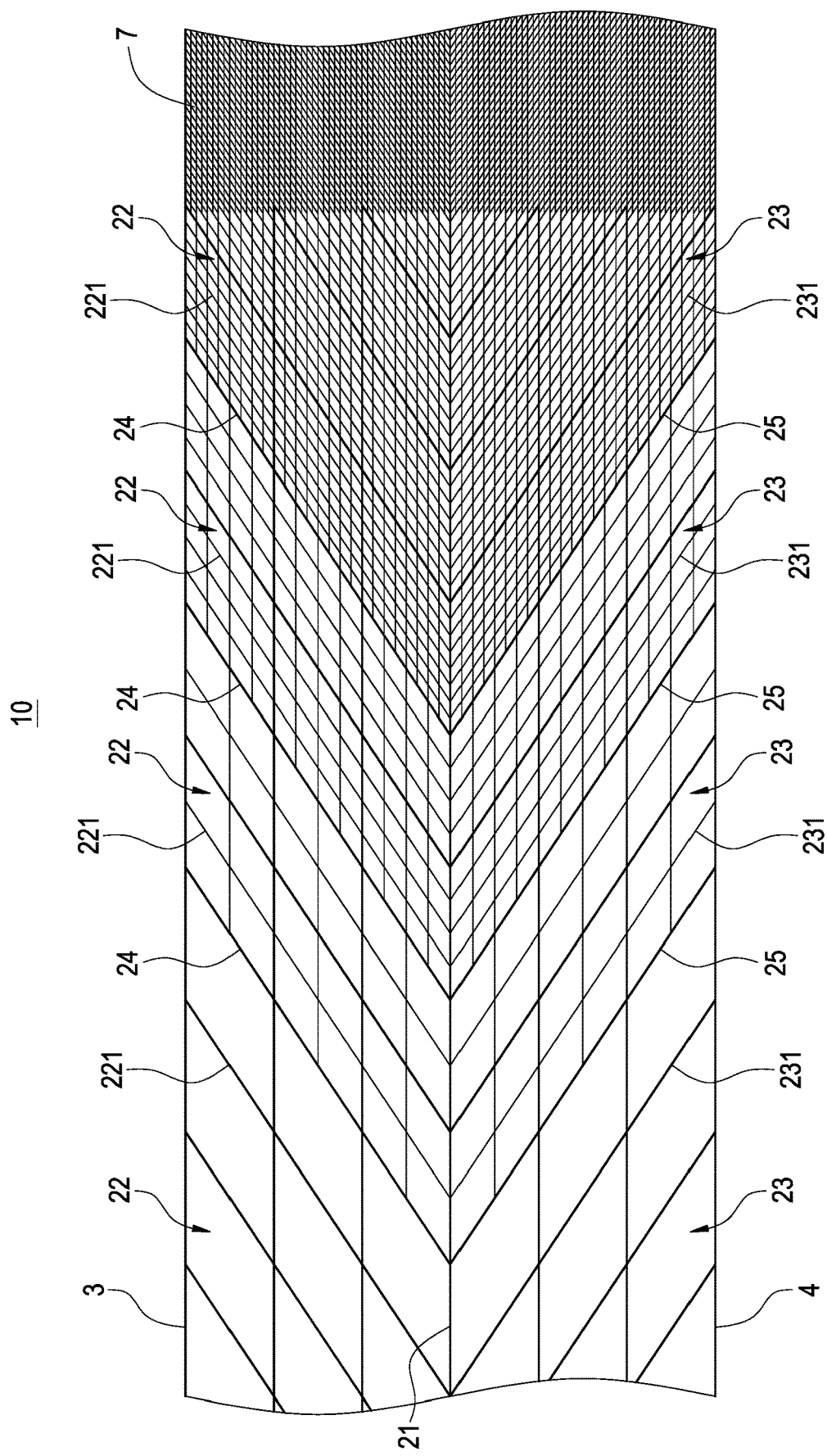
FIG. 3 is another partially enlarged schematic view of the seine net of the invention.

Please refer to FIGS. 1-3. The invention provides a seine net used for seines and trawls. The fishing net 10 is towed by a fishing ship 100 to capture fish 200. The seine net 10 mainly includes a net body 1.

As shown in FIGS. 1-3, the net body 1 is formed by woven threads (not labeled). The net body 1 includes a woven net 2, an upper rope 3 disposed at an upper side of the woven net 2, a lower rope 4 disposed at a lower side of the woven net 2, a left wing net 5 disposed at a left side of the woven net 2 and a right wing net 6 disposed at a right side of the woven net 2. There is a middle mesh section 7 in the middle of the woven net 2. The woven net 2 further includes a division rope 21 disposed between the upper rope 3 and the lower rope 4, upper mesh areas 22 woven between the upper rope 3 and the division rope 21 and horizontally juxtaposed, and lower mesh areas 23 woven between the lower rope 4 and the division rope 21 and horizontally juxtaposed.

Each upper mesh area 22 has multiple first diamond meshes 221. Each lower mesh area 23 has multiple second diamond meshes 231. The first diamond meshes 221 are reversely arranged relative to the second diamond meshes 231 on the basis of the division rope 21. The first diamond meshes 221 of the upper mesh areas 22 gradually decrease in size from the left and right wing nets 5, 6 toward the middle mesh section 7. The second diamond meshes 231 of the lower mesh areas 23 gradually decrease in size from the left and right wing nets 5, 6 toward the middle mesh section 7.

In detail, as shown in FIG. 3, the first diamond meshes 221 are reversely arranged relative to the second diamond meshes 231 in weaving direction and the upper mesh areas 22 are the same as the lower mesh areas 23 in both number of sections and position, so the first diamond meshes 221 are reversely and symmetrically arranged relative to the second diamond meshes 231 on the basis of the division rope 21.

In addition, in this embodiment, the first diamond meshes 221 of adjacent two of the upper mesh areas 22 and the second diamond meshes 231 of adjacent two of the lower mesh areas 23 change in size as follows: a first separation rope 24 is disposed between adjacent two of the upper mesh areas 22, an edge of the first diamond meshes 221 at a side of the first separation rope 24 is formed by an edge of adjacent two of the first diamond meshes 221 at the other side of the first separation rope 24, a second separation rope 25 is disposed between adjacent two of the lower mesh areas 23, and an edge of the second diamond meshes 231 at a side of the second separation rope 25 is formed by an edge of adjacent two of the second diamond meshes 231 at the other side of the second separation rope 25.

Further, each first separation rope 24 is an inclined line which gradually approaches the middle mesh section 7 from the division rope 21 to the upper rope 3, and each second separation rope 25 is an inclined line which gradually approaches the middle mesh section 7 from the division rope 21 to the lower rope 4.

Also, the size of the first diamond mesh 221 and the second diamond mesh 231 is between 0.9 m and 30 m. The mesh size of the middle mesh section 7 is less than the size of the first diamond mesh 221 and the second diamond mesh 231. Because the captured fish 200 are concentrated at the middle mesh section 7, the smaller mesh size of the middle mesh section 7 can prevent the fish 200 from escaping the meshes.

As shown in FIG. 1, the upper rope 3 is a rope body which is able to float on sea water. In this embodiment, the upper rope 3 is made of plastic as an example, but is not limited to this. The upper rope 3 is connected to an upper edge of the net body 1 to allow the upper rope 3 to float on sea water.

As shown in FIG. 1, the lower rope 4 is a rope body which is able to sink in sea water. In this embodiment, the lower rope 4 is made of nylon as an example, but is not limited to this. The lower rope 4 is connected to a lower edge of the net body 1 to allow the lower rope 4 to sink in sea water and stretch the net body 1, corresponding to the upper rope 1 to capture fish. The upper rope 3 and the lower rope 4 may adopt rope with low ductility to prevent the net body 1 from deforming.

As shown in FIGS. 1-3, when the seine net 10 is in use, the first and second diamond meshes 221, 231 can be automatically closed up while they are being pulled because of the diamond shape. Thus, when the net body 1 is retrieved, the first diamond meshes 221 and the second diamond meshes 231 will automatically close up to reduce its closing volume and increase the smoothness of retrieving the net.

In addition, the first diamond meshes 221 are reversely arranged relative to the second diamond meshes 231 on the basis of the division rope 21 and the division rope 21 is located at the middle between the upper rope 3 and the lower rope 4, so the first and second diamond meshes 221, 231 will close up toward the middle of the woven net 2 (division rope 21). This can avoid any erroneous tendencies due to uneven forces to enhance the smoothness of retrieving the seine net 10.

Furthermore, each first separation rope 24 gradually approaches the inclined line of the middle mesh section 7 from the division rope 21 to the upper rope 3, and each second separation rope 25 gradually approaches the inclined line of the middle mesh section 7 from the division rope 21 to the lower rope 4, so as to guide the upper mesh areas 22 and the lower mesh areas 23 to be superposed toward the middle mesh section 7 along the retrieving direction (retrieving from the left wing net 5 and the right wing net 6 to the middle mesh section 7) to increase the smoothness of retrieving the seine net 10.

Also, when the net body 1 is being retrieved, fish 200 will gather toward the middle position of the woven net 2 first and will not escape from the meshes until the space in the middle of the woven net 2 is insufficient. Thus, the first diamond meshes 221 of the upper mesh areas 22 gradually decrease in size from the left and right wing nets 5, 6 toward the middle mesh section 7, and the second diamond meshes 231 of the lower mesh areas 23 gradually decrease in size from the left and right wing nets 5, 6 toward the middle mesh section 7, so the meshes of the woven net 2 appear large on both sides and small in the middle. In comparison with a fishing net with all small meshes, the seine net 10 of the invention has advantages of lower cost, lighter weight and smaller volume.

Figure 4:
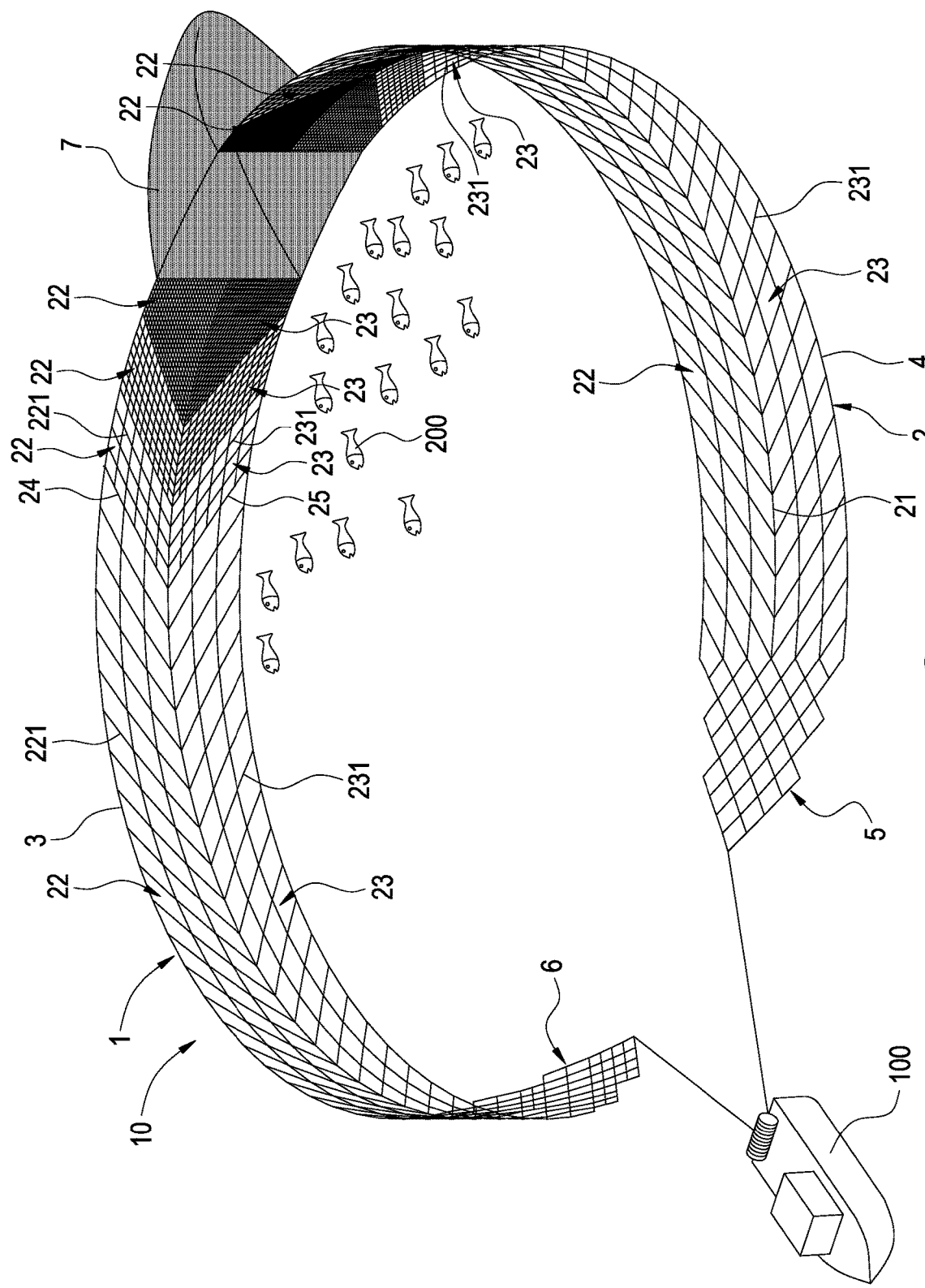
FIG. 4 is a schematic view of another embodiment of the seine net of the invention in use.

Please refer to FIG. 4, which shows another embodiment of the invention. The embodiment shown in FIG. 4 is substantially the same as the embodiment shown in FIG. 3. The embodiment shown in FIG. 4 differs from the embodiment shown in FIG. 3 in the structure of the middle mesh section 7.

As shown in FIGS. 1-3, the middle mesh section 7 is, but not limited to, a planar net. As shown in FIG. 4, the middle mesh section 7 may also be a net bag.

It will be appreciated by persons skilled in the art that the above embodiments have been described by way of example only and not in any limiting sense, and that various alterations and modifications are possible without departure from the scope of the invention as defined by the appended claims.

What is claimed is:

1. A seine net comprising:
a net body, having a woven net, an upper rope disposed at an upper side of the woven net, a lower rope disposed at a lower side of the woven net, a left wing net disposed at a left side of the woven net and a right wing net disposed at a right side of the woven net, the woven net having a middle mesh section, a division rope disposed between the upper rope and the lower rope, upper mesh areas woven between the upper rope and the division rope, and lower mesh areas woven between the lower rope and the division rope;
wherein each upper mesh area has multiple first diamond meshes, each lower mesh area has multiple second diamond meshes, the first diamond meshes are reversely arranged relative to the second diamond meshes on a basis of the division rope, the first diamond meshes of the upper mesh areas gradually decrease in size from the left and right wing nets toward the middle mesh section, and the second diamond meshes of the lower mesh areas gradually decrease in size from the left and right wing nets toward the middle mesh section;
wherein a first separation rope is disposed between adjacent two of the upper mesh areas, an edge of the first diamond meshes at a side of the first separation rope is formed by an edge of adjacent two of the first diamond meshes at another side of the first separation rope, and each first separation rope gradually approaches an inclined line of the middle mesh section from the division rope to the upper rope;
wherein a second separation rope is disposed between adjacent two of the lower mesh areas, an edge of the second diamond meshes at a side of the second separation rope is formed by an edge of adjacent two of the second diamond meshes at another side of the second separation rope, and each second separation rope gradually approaches the inclined line of the middle mesh section from the division rope to the lower rope.
2. The seine net of claim 1, wherein the first diamond meshes are reversely symmetrically arranged relative to the second diamond meshes on the basis of the division rope.

3. The seine net of claim 1, wherein the upper rope is able float on sea water, and the lower rope is able to sink in sea water.

4. The seine net of claim 3, wherein the upper rope is a plastic rope, and the lower rope is a nylon rope.

5. The seine net of claim 4, wherein the middle mesh section is a planar net or a net bag.

6. The seine net of claim 1, wherein the middle mesh section is less than the first diamond mesh and the second diamond mesh in mesh size.

* * * * *